United States Patent
Ferron

(10) Patent No.: US 7,849,786 B2
(45) Date of Patent: Dec. 14, 2010

(54) DETECTING DEVICE FOR DETECTING THE FOOD COOKING VESSEL TEMPERATURE

(75) Inventor: Francesco Ferron, Cremona (IT)

(73) Assignee: Ballarini Paolo & Figli, S.p.A., Rivarolo, Mantovano (MN) (IT)

( * ) Notice: Subject to any disclaimer, the term of this patent is extended or adjusted under 35 U.S.C. 154(b) by 0 days.

(21) Appl. No.: 11/214,251

(22) Filed: Aug. 29, 2005

(65) Prior Publication Data

US 2006/0049186 A1 Mar. 9, 2006

(30) Foreign Application Priority Data

Sep. 1, 2004 (IT) ................ MI2004A1684

(51) Int. Cl.
*A47J 27/00* (2006.01)
*A47J 36/00* (2006.01)
*A47J 45/06* (2006.01)

(52) U.S. Cl. ................ 99/342; 220/573.1; 220/756

(58) Field of Classification Search .......... 099/339, 099/340, 403–410, 450, 422–425; 16/422, 16/425, 111.1, 428, 382, 110.1; 220/758, 220/759, 912, 573.4; 374/141, 142, 147, 374/149, 179, 780

See application file for complete search history.

(56) References Cited

U.S. PATENT DOCUMENTS

| 2,750,916 | A | * | 6/1956 | Hanington | ......... 116/102 |
|---|---|---|---|---|---|
| 3,405,678 | A | * | 10/1968 | Frenkel et al. | ......... 374/141 |
| 3,695,110 | A | * | 10/1972 | Biolik | ......... 374/157 |
| 3,701,344 | A | * | 10/1972 | Walls et al. | ......... 126/388.1 |
| 4,919,983 | A | * | 4/1990 | Fremin | ......... 428/35.7 |
| 5,441,344 | A | * | 8/1995 | Cook, III | ......... 374/141 |
| 6,544,614 | B1 | * | 4/2003 | Huffer et al. | ......... 428/40.1 |
| 6,848,355 | B2 | * | 2/2005 | Cesare | ......... 99/342 |
| 6,860,192 | B2 | * | 3/2005 | Sharpe | ......... 99/342 |
| 7,112,765 | B2 | * | 9/2006 | Dall'Asta | ......... 219/438 |
| 7,157,675 | B2 | * | 1/2007 | Imura | ......... 219/627 |
| 7,364,357 | B2 | * | 4/2008 | Wu | ......... 374/161 |
| 7,484,456 | B2 | * | 2/2009 | Ferron | ......... 99/342 |
| 2004/0184511 | A1 | * | 9/2004 | Kwon | ......... 374/208 |
| 2005/0103209 | A1 | * | 5/2005 | Ferron | ......... 99/422 |

FOREIGN PATENT DOCUMENTS

DE 3205998 C * 6/1983
WO WO 99/59455 A1 * 11/1999

* cited by examiner

Primary Examiner—Joseph M Pelham
(74) Attorney, Agent, or Firm—Kirschstein, et al.

(57) ABSTRACT

A detecting device for detecting the food cooking vessel temperature comprises a fireproof bulkhead including a throughgoing hole, and in which between an inner wall of the fireproof bulkhead and a cooking vessel handle a plate coated by a thermochromatic paint layer visible through the throughgoing hole is arranged.

5 Claims, 3 Drawing Sheets

DETECTING DEVICE FOR DETECTING THE FOOD COOKING VESSEL TEMPERATURE

BACKGROUND OF THE INVENTION

The present invention relates to a detecting device for detecting the food cooking vessel temperature.

Is already known in the prior art to provide, inside a food cooking vessel, for example on the inner bottom of the latter, a zone covered by a thermochromatic paint, to indicate a set temperature achieved by the vessel.

However, this system properly operates only if the inner bottom of the cooking vessel is covered by a transparent or clear food product, such as oil or water: in fact, in cooking foods as sauces, vegetables or the like, the bottom of the vessel would be covered by this not clear food, and, accordingly, it would not be possible to detect the achieved temperature.

In another approach, as further known in the prior art, it has been suggested to apply a thermochromatic paint layer directly outside of the cooking vessel, for example on the fireproof bulkhead, designed for fitting the handle of a cooking pan, or directly thereon, if it would be made of a steel material.

On the other hand, this prior thermochromatic paint application system is affected by the drawback that it is necessary to perform and manage a special paint application step, in a piece-by-piece manner, by using manual transfer systems and comparatively complex procedures, for example buffering, transfer printing or spray painting methods.

The above paint systems require a lot of labour, since they must be carried out manually, and, moreover, do not allow to achieve even quality properties.

SUMMARY OF THE INVENTION

Accordingly, the aim of the present invention is to provide a novel method for providing food cooking vessels with thermochromatic paint devices to indicate or detect their temperature, and which is free of the above disclosed prior art drawbacks.

According to one aspect of the present invention, the above aim is achieved by a device for detecting the temperature of a food cooking vessel, said cooking vessel comprising a fireproof bulkhead having an inner wall and a vessel handle, characterized in that said fireproof bulkhead comprises a throughgoing hole and that between said inner wall of said fireproof bulkhead and said handle a plate coated by a thermochromatic paint layer visible through said throughgoing hole is arranged.

BRIEF DESCRIPTION OF THE DRAWINGS

The detecting device according to the present invention will be hereinafter disclosed in a more detailed manner with reference to an embodiment thereof which is illustrated, by way of an indicative example, in the accompanying drawings, where.

DESCRIPTION OF THE PREFERRED EMBODIMENTS

Figure 1:
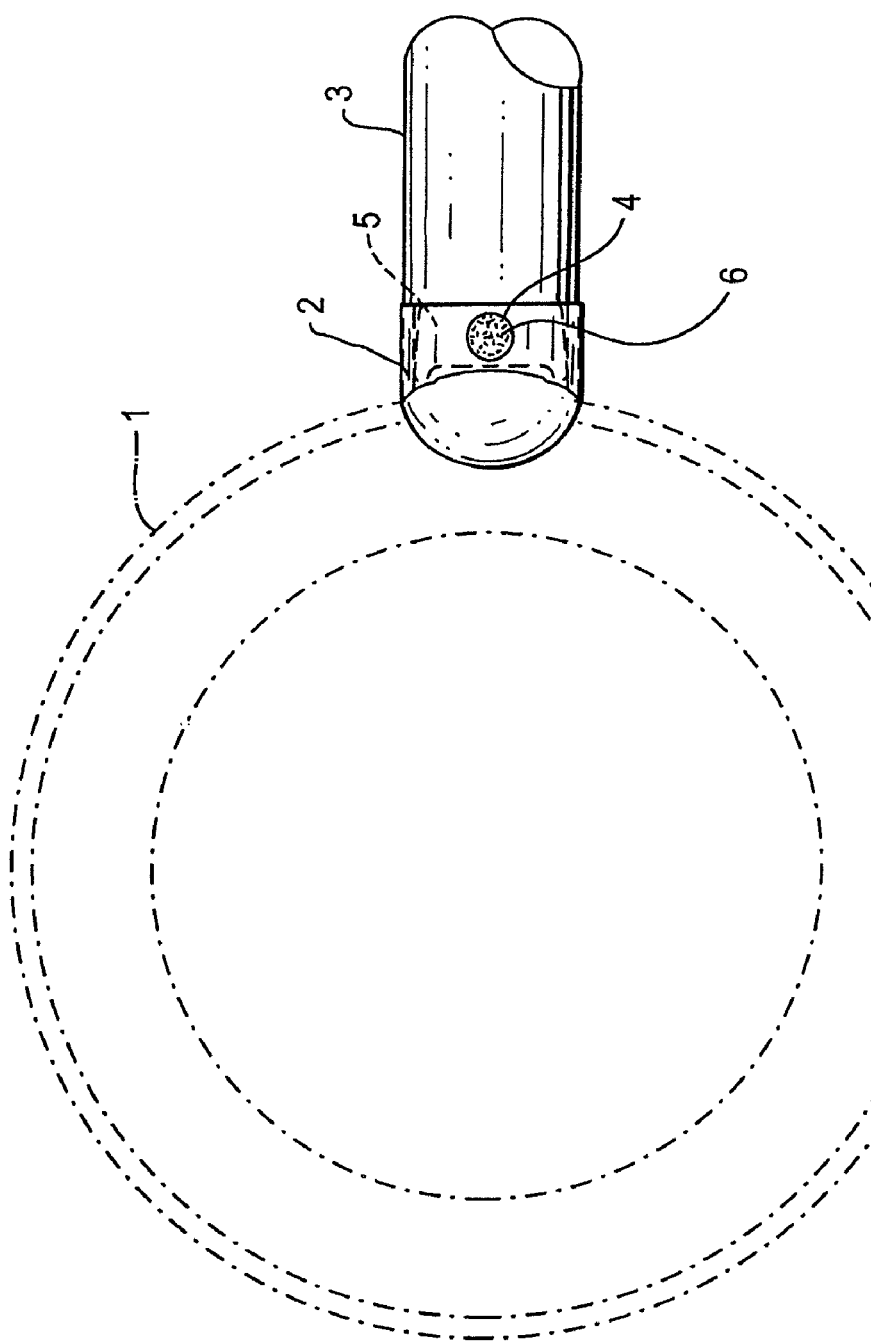
FIG. 1 shows a pan fireproof bulkhead including the device comprising a thermochromatic paint layer for detecting or indicating an achieved temperature.

In FIG. 1 is shown, by way of an example, a pan 1, schematically indicated by a dash and dot line, rigid with a conventional fireproof bulkhead 2, in which, in a per se known manner, a handle 3 is engaged.

The fireproof bulkhead 2 comprises, in the visible region thereof, a throughgoing hole 4.

Between the handle 3 and the inside of the wall of the fireproof bulkhead 2 a small plate 5 is arranged, which will be disclosed in a more detailed manner hereinafter.

Said plate 5 comprises a coating made of a thermochromatic paint 6, and visible through the throughgoing hole 4 formed in the fireproof bulkhead 2 body.

Figure 2:
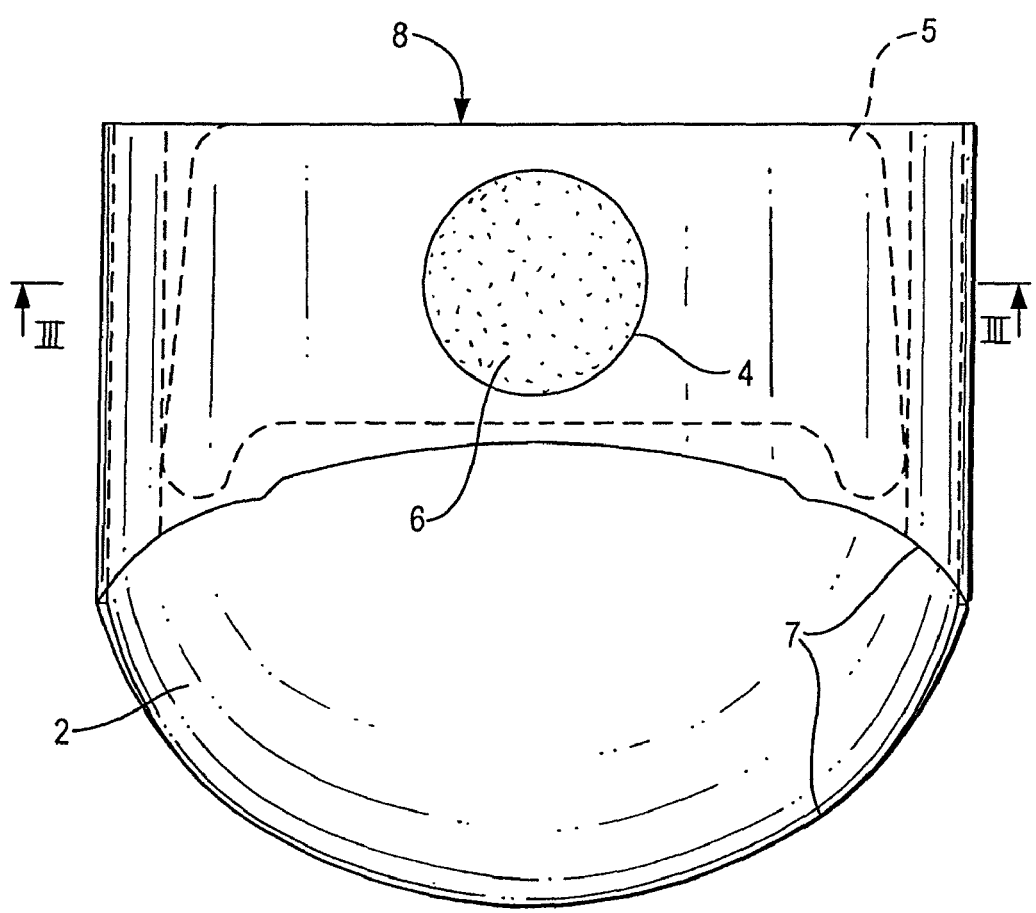
FIG. 2 is a top plan view of the fireproof bulkhead, provided with the detecting device according to the present invention.

FIG. 2 shows a top plan view of said fireproof bulkhead 2.

The front side of the fireproof bulkhead, indicated by 7, is rigid with the cooking vessel (not shown), whereas the rear portion of the fireproof bulkhead comprises an opening 8 therethrough the handle 3 (not shown in FIG. 2) can be fitted.

As shown, said plate 5, advantageously made of a metal material, is coated by a thermochromatic paint layer 6, which can be perfectly seen through said throughgoing hole 4.

Depending on the used paint, the plates 5 can be coated by a differentiated thermochromatic sensitivity coating 6.

Figure 3:
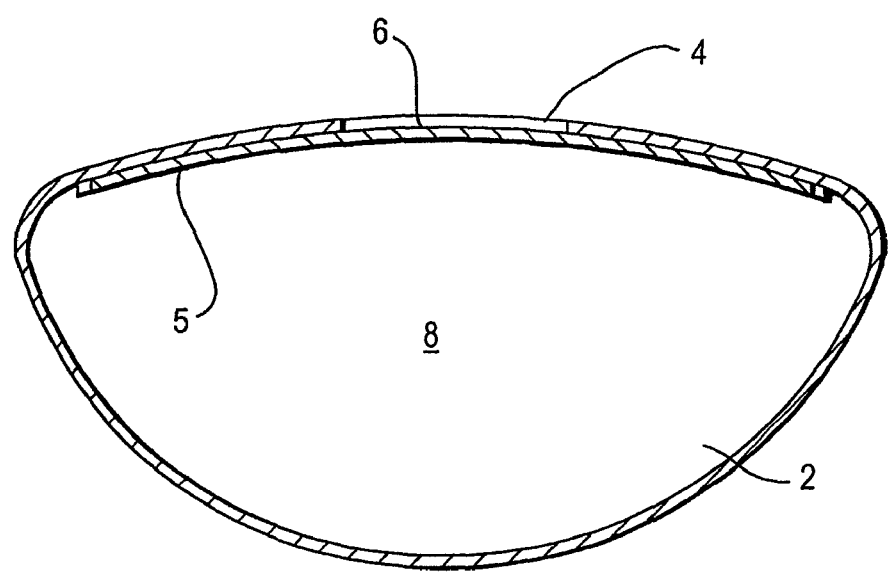
FIG. 3 is a cross-sectional view, taken along the like III-III of FIG. 2, of the fireproof bulkhead.

FIG. 3 shows the fireproof bulkhead in cross-section, substantially taken along the section line III-III of FIG. 2. In particular are herein shown the opening or recess 8 for fitting the handle 3 (not shown), the plate 5 coated by its thermochromatic coating 6, which can be easily seen by the vessel user through the throughgoing hole 4 formed at the top of the wall of the fireproof bulkhead 2.

Figure 4:
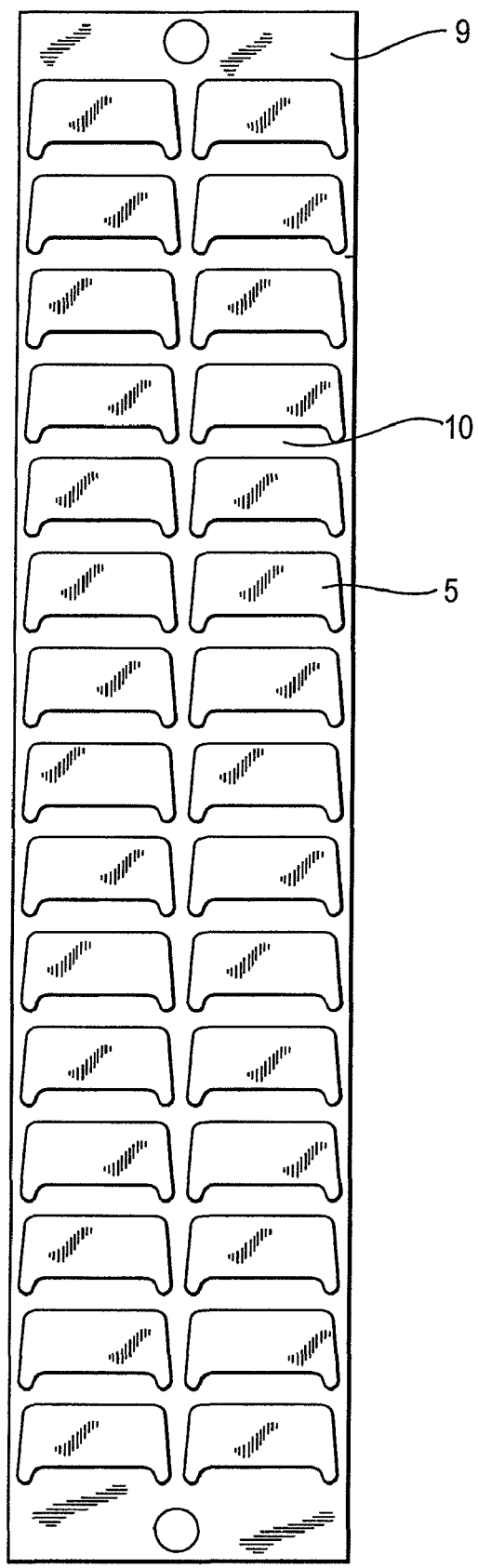
FIG. 4 is a top plan view of a strip having a plurality of small plates coated by a thermochromatic layer and to be used with a food cooking vessel.

FIG. 4 shows a strip of a sheet metal material, generally indicated by the reference number 9.

The surface of said strip 9 is integrally covered by a coating layer having thermochromatic characteristics and indicated by the reference number 10.

Advantageously, the sheet metal material 9 is chemically pre-processed, for example by a galvanic passivating method or by a mechanical sanding or brushing method, and then is provided with the thermochromatic paint layer, which can be applied either with one or more coats by a dipping, screen printing or spraying method.

Finally, a clear or transparent layer will be advantageously applied, to cover, seal and accordingly protect the plate 5 thermochromatic paint for example from aggressively liquids exiting the cooking vessel in cooking foods, or from corrosive phenomena occurring in washing the cooking vessel in dishwashing machines.

It would be moreover advantageous to pre-shear, after the painting step, the individual plates 5, to render them easily available during the assembling of said plates in said cooking vessel.

The invention claimed is:

1. A device for detecting temperature of a food cooking vessel having a fireproof bulkhead with an inner wall and a vessel handle, comprising:
   a throughgoing hole in the fireproof bulkhead; and
   a metal plate mounted inside said fireproof bulkhead in direct contact with said inner wall of said fireproof bulkhead, the plate being coated by a thermochromatic paint layer visible through said throughgoing hole, the thermochromatic paint layer being coated by a top protective clear layer.

2. The detecting device, according to claim 1, characterized in that said thermochromatic paint layer has a differentiated thermographic sensitivity.

3. The detecting device, according to claim 1, characterized in that said plate is made of a sheet metal material which is chemically pre-processed by a galvanic passivating, mechanical sanding, brushing method, after which said thermochromatic paint layer is applied, either with one or more covering coats, by a dipping, screen printing or spraying method.

4. The detecting device, according to claim 1, characterized in that said plate is pre-sheared for easy assembly.

5. A food cooking vessel, having a fireproof bulkhead with an inner wall and a vessel handle, comprising:
 a throughgoing hole in the fireproof bulkhead; and
 a metal plate mounted inside said fireproof bulkhead in direct contact with said inner wall of said fireproof bulkhead, the plate being coated by a thermochromatic paint layer visible through said throughgoing hole, the thermochromatic paint layer being coated by a top protective clear layer.

* * * * *